United States Patent [19]

Gregg

[11] Patent Number: 4,763,947
[45] Date of Patent: Aug. 16, 1988

[54] SUNSHIELD FOR MOTOR VEHICLE

[75] Inventor: Harold E. Gregg, Woodstock, Ill.

[73] Assignee: Stone Container Corporation, Chicago, Ill.

[21] Appl. No.: 66,942

[22] Filed: Jun. 25, 1987

[51] Int. Cl.⁴ .................................................. B60J 3/00
[52] U.S. Cl. ................... 296/97 R; 296/97 G; 296/95 C; 160/35; 160/370.2
[58] Field of Search .............. 296/97 R, 97 C, 97 G, 296/97 D, 141, 95 C; 160/35, 84 R, 134

[56] References Cited

U.S. PATENT DOCUMENTS

| 1,018,498 | 2/1912 | Ilse | 296/141 |
| 1,421,716 | 7/1922 | Randall | 160/35 |
| 2,546,438 | 3/1951 | Grabill | 160/327 |
| 2,560,762 | 7/1951 | Ghegan | 160/134 |
| 2,567,528 | 9/1951 | Rosenthal | 160/35 |
| 4,202,396 | 5/1980 | Levy | 160/107 |
| 4,332,414 | 6/1982 | Surtin | 160/134 |
| 4,652,039 | 3/1987 | Richards | 296/97 |

Primary Examiner—Robert R. Song
Attorney, Agent, or Firm—Myron C. Cass

[57] ABSTRACT

A window shade for a motor vehicle is made of a generally rectangular sheet of material and provided with substantially straight upper, lower and side edges. The sheet is provided with an axial fold line and a plurality of radial fold lines emanating from the approximate intersection of the axial fold line and the bottom edge and extending between the top and the side edges to form a plurality of triangular panels and to permit the sheet to fold in accordion fashion.

18 Claims, 1 Drawing Sheet

U.S. Patent  Aug. 16, 1988  4,763,947
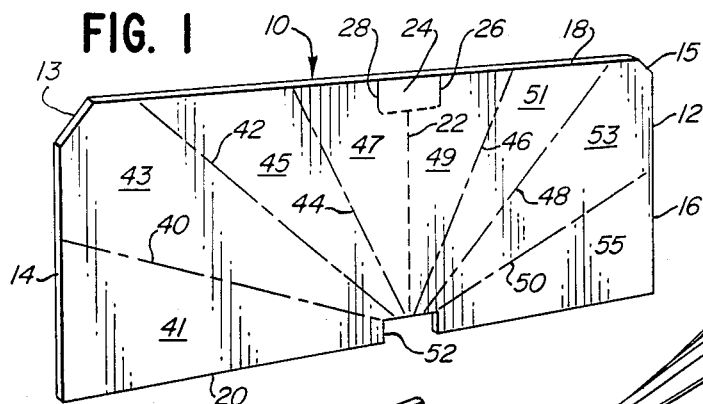
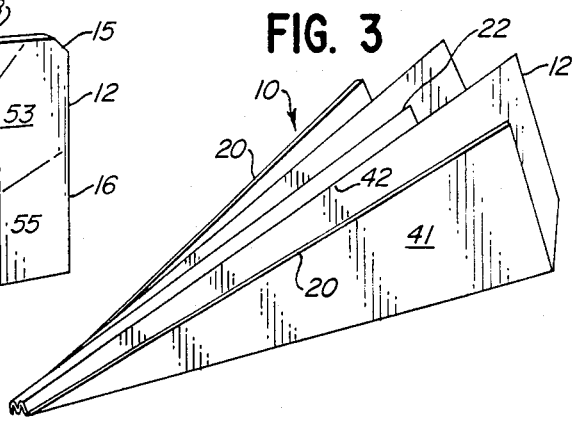
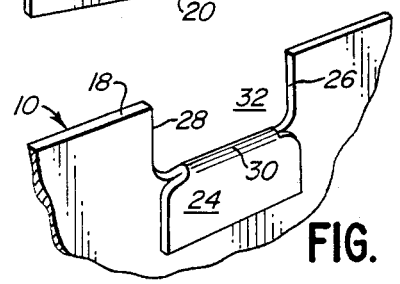
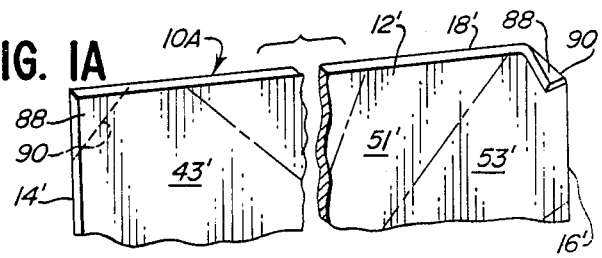
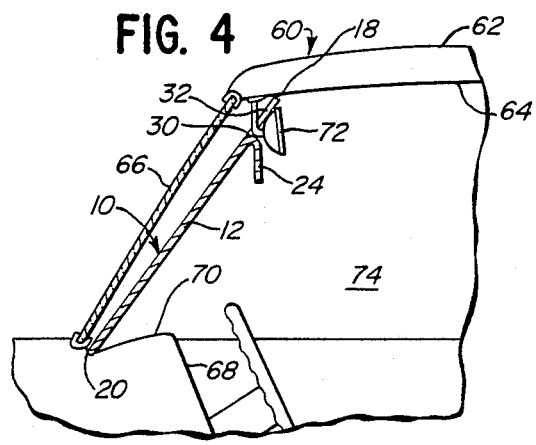
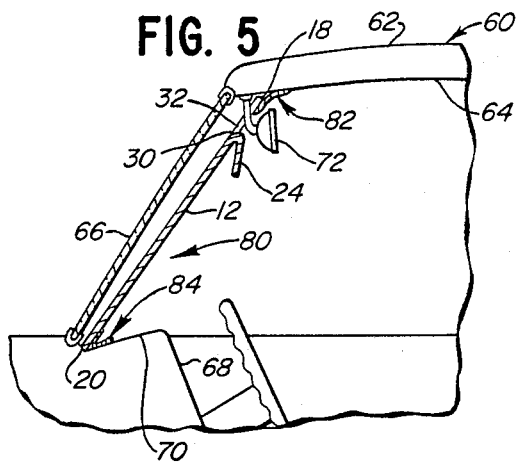
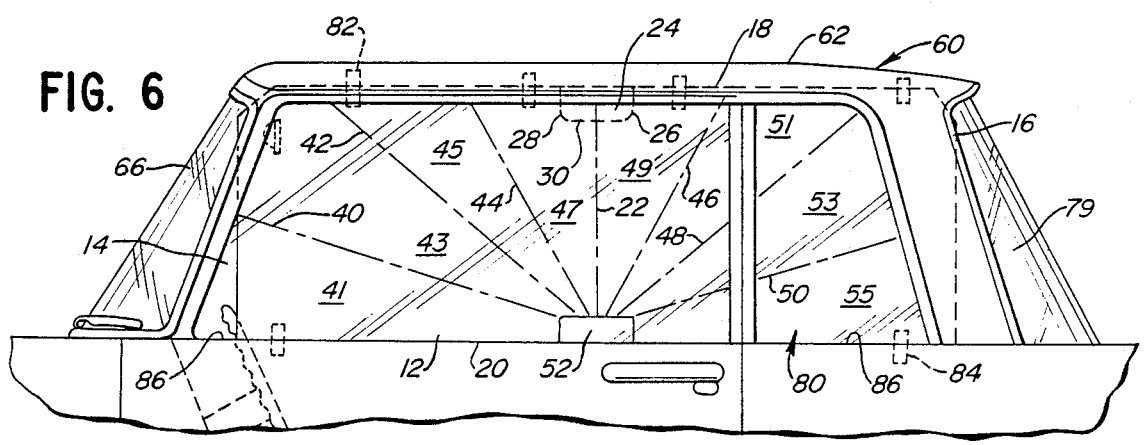

SUNSHIELD FOR MOTOR VEHICLE

BACKGROUND OF THE INVENTION

1. Field of the Invention

This invention relates to temporary sunshields or shades designed to be placed in the windshield or side or rear window of a parked motor vehicle.

2. Description of the Prior Art

When a vehicle is parked in an open, unshaded area during the day, the sun's rays may be transmitted through the windshield or other windows of the vehicle for extended periods of time. In a manner similar to a greenhouse, the interior of a closed vehicle will retain heat and raise the interior atmosphere to relatively high temperatures. Such elevated temperatures may cause articles left inside the vehicle to melt, or the dashboard to discolor or crack, and the steering wheel or seats to become too hot to touch. The sun's rays also will fade or bleach upholstery fabrics.

Sunshields of the general type with which this invention is concerned are disclosed in U.S. Pat. Nos. 4,202,396 and 4,652,039. These patents feature foldable sunshields or shades provided with interconnected rectangular panels which are foldable in accordion style for storage and unfoldable into the shade for installation opposite or behind the window of a motor vehicle to block entry of sun rays through the window into the vehicle interior. When installed, the fold lines between adjacent panels are oriented perpendicularly or vertically relative to the bottom edge of the window. Thus, the fold lines of the device are parallel to each other and thereby are believed to effect an inherent tension which tends to collapse the shield or shade from its normal installed position.

A drawback of conventional shades is that, although the vertical accordion folds permit horizontal adjustability to accommodate variations in windshield length, no provision is made for variations in windshield height and slant relative to the dashboard. This is a significant drawback, since a shade which is wide enough adequately to block the windshield of a full-size automobile becomes bulky and unwieldy in a smaller compact vehicle. The standard width of conventional shades and their rearview mirror cutouts also fail to accommodate variations in rearview mirror size and position.

Other patents related to sunshade devices for vehicles are U.S. Pat. Nos. 2,546,438, 2,560,762, 1,018,498 and 1,421,716.

The sunshields embodying the invention is comprised of a series of hingedly connected or foldable panels of generally wedge or triangular configuration which contributes to adjustability in the span thereof when unfolded to accommodate variations in windshield height and slant relative to the vehicle dashboard and rearview mirror position also. This sunshade is suitable for installation across side windows or the rear window of the vehicle when suitably dimensioned.

SUMMARY OF THE INVENTION

The motor vehicle window shade of the invention is a flat sheet material designed to be placed opposite or behind either the front, side or rear window of a motor vehicle to shade the interior therof from the sun. The sheet is provided with generally straight top, bottom and side edges, an axial fold line extending between the top and bottom edges and a plurality of radial fold lines emanating from the general intersection of the axial fold line and the bottom edge and extending toward the top and side edges. The radial fold lines permit the shade to fold in fan-like fashion. A cutout portion is provided in the intersection area to facilitate proper positioning of the shade when unfolded.

The sunshield can be installed for blocking sun rays either through the windshield or the side or rear windows of the vehicle. When installed for shielding the windshield, the sunshield can be held in place by using the interior sun visors or rearview mirror of the vehicle. It is contemplated that releasable fasteners also may be used. When installed for shielding side or rear windows, releasable fastening means are preferred. The radial fold lines cooperate to provide a lower straight edge in the unfolded position of the shade which can be supported on a ledge or window sill and which edge remains straight even when the shade is partially folded.

BRIEF DESCRIPTION OF THE DRAWINGS

FIG. 1 is a perspective view of the shade of the invention in completely expanded condition;

FIG. 1A is a fragmentary perspective view of a modified embodiment of the shade depicted in FIG. 1, and showing foldable upper corner flaps on the shade;

FIG. 2 is an enlarged fragmentary perspective view of the shade depicted in FIG. 1, showing the rearview mirror cutout and flap;

FIG. 3 is a perspective view of the shade of the invention in the folded condition;

FIG. 4 is a fragmentary side elevational view of a vehicle with the shade shown in section installed relative to the windshield of the vehicle also shown in section;

FIG. 5 is a fragmentary side elevational view similar to FIG. 4, but illustrating the use of releasable fastening means for securing the shade; and FIG. 6 is a fragmentary side elevational view of a motor vehicle showing the shade of the invention installed in a side window thereof.

DESCRIPTION OF THE PREFERRED EMBODIMENTS

Referring to FIG. 1, the shade of the invention is indicated generally at 10 and is essentially a planar sheet 12 of substantially rectangular configuration. The sheet 12 is fabricated of a self supporting, yet flexible opaque material, such as corrugated cardboard or composition board. Regardless of the material selected, it should be flexible enounght to not damage the interior of the vehicle during installation and/or removal.

The sheet 12 is generally planar; it has a pair of substantially parallel side edges 14 and 16, a straight upper edge 18 and a straight lower edge 20. In the preferred embodiment, the edges 18 and 20 are substantially parallel. The upper edge 18 is slightly shorter than the lower edge 20 because of the truncated corners 13 and 15 respectively, which function to facilitate installation behind or opposite the windshield of a motor vehicle. The sheet 12 is provided with an axial fold line 22 extending between the upper edge 18 and the lower edge 20.

Referring to FIGS. 1 and 2, at the general intersection of the axial fold line 22 and the upper edge 18, a rearview mirror flap 24 is created by cutting two edges 26 and 28 into the sheet 12 and providing a hinge or score line 30 along the lower edge of the flap 24. When the flap 24 is detached along the scored edges 26 and 28, and folded down as shown in FIG. 2, a rearview mirror access recess 32 is formed. The recess 32 is dimensioned to be narrower than the width of the rearview mirror 72, and its function will be described in greater detail below. It will be appreciated that the flap 24 may be omitted or detached completely from the sheet 12 since the desired goal is to provide the access recess 32.

Referring now to FIGS. 1 and 3, the sheet 12 is provided with a plurality of fold lines 40, 42, 44, 46, 48 and 50 which emanate in radial fan-like fashion from the general intersection of the axial fold line 22 and the lower edge 20. The radial fold lines 40 and 50 extend to the respective side edges 14 and 16, and the fold lines 42, 44, 46 and 48 extend to the upper edge 18. The fold lines 22, 40, 42, 44, 46, 48 and 50 delineate triangular panels 41, 43, 45, 47, 49, 51, 53 and 55 and allow the sheet 12 to completely collapse in fan-like or accordion style for compact storage of the shade 10 when not in use. This folded condition is depicted in FIG. 3, slightly exaggerated for purposes of illustration.

It has been found that the sheet 12 will not completely unfold as shown in FIG. 1 unless a cutout portion 52 is provided at the general or approximate intersection of the axial fold line 22 and the lower edge 20. Although the cutout 52 is shown having a rectangular shape, any configuration is acceptable, as long as the general intersection point of the folds 22, 40, 42, 44, 46, 48 and 50 is kept open.

FIG. 4 depicts the shade 10 of the invention installed in a motor vehicle 60 provided with a roof 62, a headliner 64, a windshield 66, a dashboard 68 and a dashboard ledge 70. With the exception of the cutout 52, the lower edge 20 is in uninterrupted contact with the ledge 70 in the narrowed area near the base of the windshield 66. In many models of vehicle 60, the bottom edge 20 will become wedged between the ledge 70 and the windshield 66. Regardless of the type of vehicle 60 or the size of the windshield 66, the bottom edge 20 will be in continuous contact with the dashboard ledge 70 so that sunlight may not pass therethrough except through the cutout portion 52. The upper edge 18 of the shade 10 is shown in close proximity to the headliner 64, and the shade is supported in the areas adjacent the scored edges 26 and 28 by the rearview mirror 72 which has been passed through the access recess 32. The flap 24 is folded upon the hinge 30 to a vertically depending position so that the mirror 72 is not obstructed. The shade 10 may also be secured behind the windshield 66 by conventional vehicle sun vizors (not shown).

In FIG. 4 the shade 10 is shown installed in the vehicle 60 so that the top edge 18 is in close proximity to the headliner 64 and the sheet 12 is fully extended, as shown in FIG. 1. When conventional shades are installed in a smaller car, the top edge would normally become wedged against the headliner 64, or the shade would have to be inclined into the passenger compartment 74, making it difficult to enter and exit from the vehicle. Although variously dimensioned sheets 12 are contemplated to fit vehicle windows of various sizes, the shade 10 of the invention obviates this problem through use of the radial folds 40, 42, 48 and 50. When a shorter windshield 66 is encountered, the sheet 12 partially collapses at folds 40 and 50, so that the portion of the sheet defined by the folds 42 and 48, i.e. the panels 45, 47, 49 and 51, falls on slightly forward into the cab or passenger compartment 74, thus lowering the effective height of the top edge 18. In this same manner, variations in the mounting position of rearview mirror 72 may be accommodated, as the sheet 12 may partially collapse so that mirrors mounted lower on the windshield 66 may still pass through the access recess 32. Even if the sheet 12 is partially collapsed, the lower edge 20 is still in continuous contact with the dashboard ledge 70.

Referring to FIG. 1A, a modified embodiment of the sunshield 10A is illustrated. The modification is provided in the sheet 12' by extending the upper edge 18' at each extremity thereof to form a corner flap 88. Each corner flap 88 is hingedly connected to the main body of sheet 12' by the diagonal score line 90 which extends between upper edge 18' and an adjacent side edge 14' or 16' as the case may be. The flap 88 illustrated in the upper righ-hand corner of the sheet 12' is bent inwardly to illustrate its desired operational position, whereas the upper left-hand flap 88 is shown prior to bending thereof. In its bent or operational position folded at an angle relative to the plane of the sheet 12', a flap 88 can be wedged into the juncture of the roof and windshield of the vehicle on the inside of the cab so as to assist retaining the sunshield against being inadvertently dislodged.

Referring now to FIG. 5, an alternate embodiment of the sunshade is indicated generally at 80. The shade 80 is identical to the shade 10 in all respects, with the addition of a plurality of upper and lower releasable fastener tapes 82 and 84 respectively, which secure the shade 80 to the headliner 64 and, if necessary to the dashboard ledge 70 of the vehicle 60. The fasteners 82 and 84 may be provided with releasable adhesive, VELCRO® type releasable fastener tapes or similar suitable fasteners. In most cases, lower fasteners 84 will not be needed to secure the lower edge 20 of the sheet 80 to the ledge 70.

FIG. 6 illustrates how the alternate shade 80 may be positioned behind or opposite the side windows 76 an 78 of the vehicle 60. In this case, the upper tapes 82 are fastened to the headliner 64, while the lower tapes 84 are fastened to the window sill 86. Although not shown, the shade 80 may also be similarly placed opposite or behind the rear window 79.

Thus, the shade of the present invention is adjustable for use in vehicles with a variety of windshield heights, is provided with a straight lower edge which does not allow the passage of sunlight therethrough, and in alternative form, may be positioned opposite the side and rear vehicle windows as well.

While a preferred embodiment of the invention has been shown, it will be understood that the invention may be otherwise embodied with the scope of the appended claims. Minor variations in the structure and in the arrangement and size of the various parts may occur to those skilled in the art without departing from the spirit and scope of the invention.

I claim:

1. A foldable window shade for a motor vehicle comprising:
    a generally rectangular integral sheet having upper, lower and side edges;
    said sheet having an axial fold line extending between said upper and lower edges, and a plurality of radial fold lines emanating from the general intersection of said axial fold line and said lower edge and extending to said top and side edges, said sheet being collapsible along said fold lines to fold in fan-like fashion and including means for substantially preventing said window shade from folding when erected.

2. The shade defined in claim 1 wherein said upper and lower edges are substantially parallel one to the other.

3. The shade defined in claim 2 wherein said upper edge is shorter in length than said lower edge to provide truncated corners thereat.

4. The shade defined in claim 1 wherein said upper edge is provided with a medial recess to accommodate a rearview mirror therethrough.

5. The shade defined in claim 1 wherein said upper edge is provided with a hinged central flap foldable to expose an access recess to accommodate a rearview mirror therethrough.

6. The shade defined in claim 1 wherein said sheet has hingedly connected flaps at the opposing upper corners thereof foldable at an angle relative to the plane of the sheet.

7. The shade defined in claim 1 wherein such means includes said intersection having a cutout portion extending to said lower edge.

8. The shade defined in claim 1 wherein at least said upper edge is provided with releasable fasteners for securing said shade behind the window of a motor vehicle.

9. A collapsible sunshade for installation in a motor vehicle to prevent transmission of sun rays into the cab of the vehicle through the windshield thereof, said sunshade comprising:
A. a planar integral sheet of flexible, self-supporting material of generally rectangular configuration having substantially parallel upper and lower edges and parallel opposing side edges and including means for substantially preventing said window shade from folding when erected;
B. an axial fold line extending from said upper edge toward said bottom edge parallel to the side edges;
C. a plurality of fold lines extending radially from opposite sides of said axial fold line to said upper and side edges respectively;
D. said sunshade adapted to be erected and installed opposing the windshield on the vehicle interior to intercept sun rays; and
E. to be collapsed for storage into a fan-like configuration.

10. The sunshield defined in claim 9 wherein said sheet is fabricated of corrugated paperboard.

11. The sunshield defined in claim 9 wherein said sheet is configured and dimensioned for installation opposing side windows of the vehicle.

12. The sunshield defined in claims 9 or 11 including releasable fastener means for retaining the sunshield in its installed position.

13. The sunshield defined in claim 9 wherein said upper edge has a recess formation for accommodating a rearview mirror therethrough in the installed position of the sunshield.

14. The sunshield defined in claim 9 wherein said sheet has foldable flaps at the upper corners thereof.

15. The sunshield as defined in claim 9 wherein said upper edge is shorter in length than said lower edges to provide truncated corners thereat.

16. The sunshield defined in claim 9 wherein said axial fold line includes a cutout portion extending to said bottom edge.

17. A window shade for a motor vehicle comprising:
a generally rectangular sheet having upper, lower and side edges;
said sheet having an axial fold line extending between said upper and lower edges, and a plurality of radial fold lines emanating from the general intersection of said axial fold line and said lower edge and extending to said top and side edges, said sheet being collapsible along said fold lines to fold in fan-like fashion, said intersection including a cutout portion extending to said lower edge.

18. A collapsible sunshade for installation in a motor vehicle to prevent transmission of sun rays into the cab of the vehicle through the windshield thereof, said sunshade comprising:
A. a planar sheet of flexible, self-supporting material of generally rectangular configuration having substantially parallel upper and lower edges and parallel opposing side edges;
B. an axial fold line extending from said upper edge toward said bottom edge parallel to the side edges, said axial fold line includes a cutout portion extending to said bottom edge;
C. a plurality of fold lines extending radially from opposite sides of said axial fold line to said upper and side edges respectively;
D. said sunshade adapted to be erected and installed opposing the windshield on the vehicle interior to intercept sun rays; and
E. to be collapsed for storage into a fan-like configuration.

* * * * *